United States Patent [19]
Craig

[11] Patent Number: 4,975,546
[45] Date of Patent: Dec. 4, 1990

[54] ROTATION AND DISPLACEMENT SENSING APPARATUS

[76] Inventor: Timothy R. Craig, 17 Caledonia Place, Clifton, Bristol, England, BS8 4OJ

[21] Appl. No.: 402,780
[22] Filed: Sep. 5, 1989

[30] Foreign Application Priority Data
Sep. 2, 1988 [GB] United Kingdom ............... 8821675

[51] Int. Cl.$^5$ .................................... G08C 21/00
[52] U.S. Cl. ........................... 178/19; 340/709
[58] Field of Search ............ 178/18, 19; 340/706, 340/709

[56] References Cited
U.S. PATENT DOCUMENTS
3,876,831  4/1975  Wickham et al. ............... 178/19
4,289,927  9/1981  Rodgers ............................. 178/19

*Primary Examiner*—Stafford D. Schreyer
*Attorney, Agent, or Firm*—Larson and Taylor

[57] ABSTRACT

A position sensing apparatus that can be used with a compatible digitizing tablet to generate positional and rotational information. The apparatus contains two mutually perpendicular windings which are fed with AC waveforms on phase quadrature. The magnetic field generated by these windings is detected by the digitizing tablet. Alternatively, the perpendicular coils may be used to detect an externally generated magnetic field. A further winding can be added to give positional information. All windings can be arranged in a disclosed manner, and incorporated into a hand held system.

10 Claims, 5 Drawing Sheets

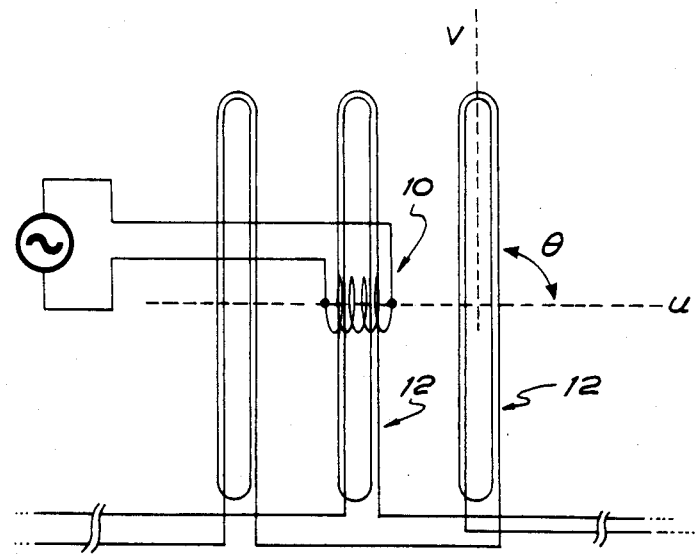
_FIG. 5_
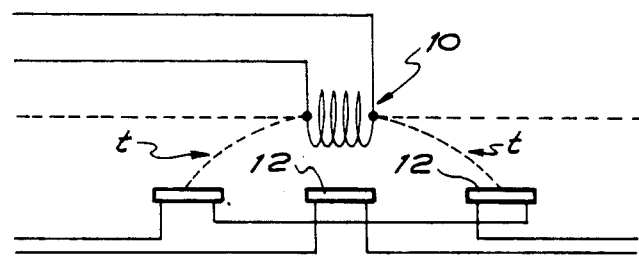
_FIG. 6_
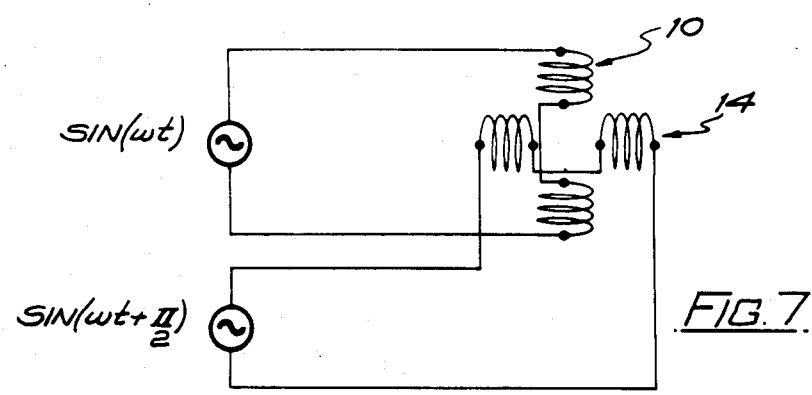
_FIG. 7_

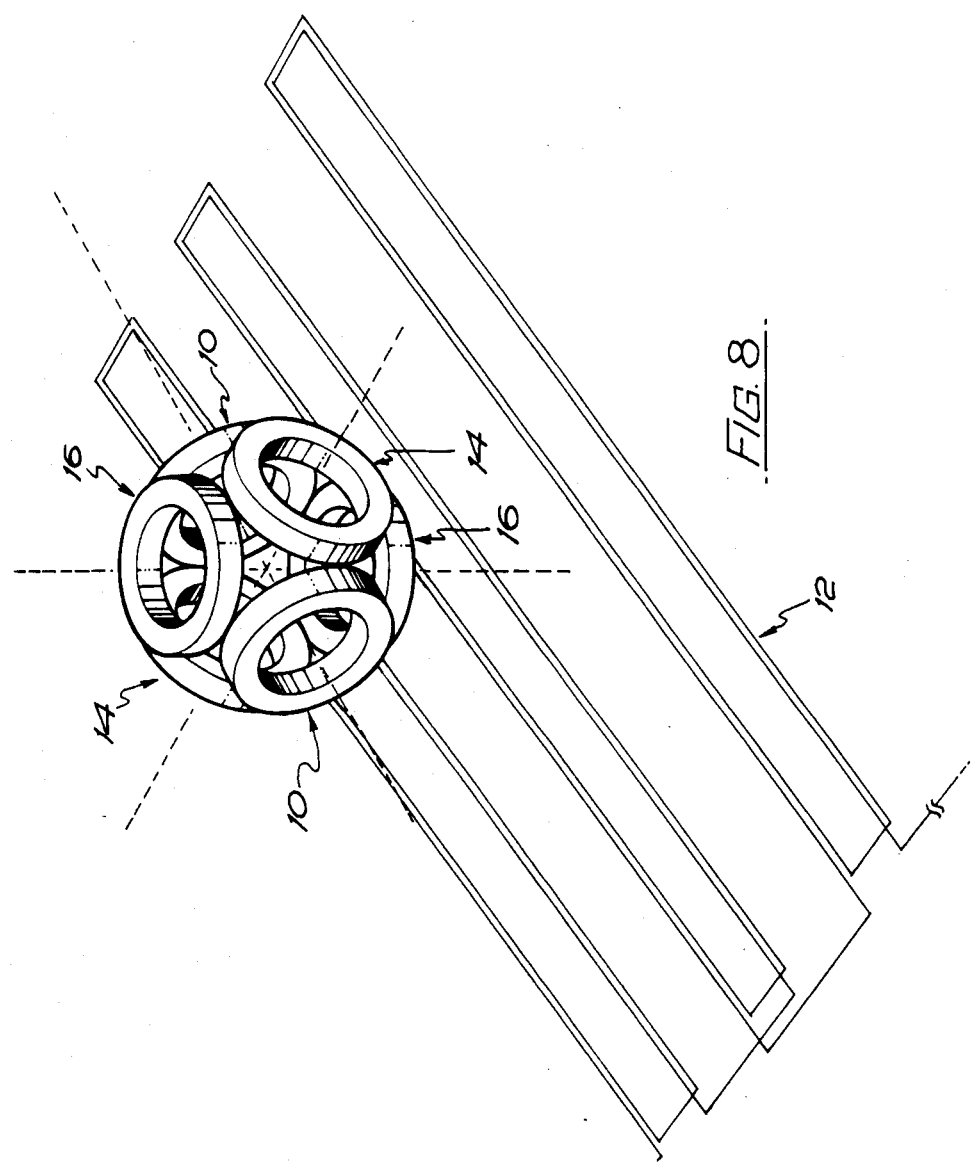

ROTATION AND DISPLACEMENT SENSING APPARATUS

BACKGROUND OF THE INVENTION

1. Field of the Invention

This invention relates to apparatus for generating computer data from the position of an object, such as might be used for determining the position of a stylus on a digitiser tablet.

2. Summary of the Prior Art

The stylus used on these tablets can be virtually any sort of pointing device. This could be in the form of a pen-like object, or a sliding puck with a cross-hair to indicate the sensitive point.

There are various known ways of obtaining x-y positional information in the form of computer data from a writing tablet. The stylus can be passive, writing on an active receiving surface (e.g. resistive and capacitative methods), or the stylus can be active, writing on a passive surface (e.g. optical, sound, infra-red, or electromagnetic), or a mechanical linkage can be used (e.g. the pantograph).

Passive stylus/active surface methods are often open to error by virtue of not being able to reliably distinguish between the stylus and any other pointed object. This problem can be overcome by having a manually operated switch to signal that a reading is to be taken. Usually, this switch is connected to the stylus nib, and so there must, by necessity, be some contact between the stylus and the drawing surface.

Active stylus/passive surface methods avoid the need for direct contact between the stylus and the drawing surface, but can be ineffectual if the transmitted signal from the stylus is obscured in some way before it is received by the detection device (which may not even be on the surface of the tablet). Of all these methods, electromagnetic induction has the desirable advantage of being relatively unaffected in its propogation by most intervening media, as well as avoiding the drawbacks of the passive techniques.

All these afore-mentioned methods are used only to measure the displacement across the "x" and "y" axes of the digitiser surface.

A known digitiser technology uses position sensing apparatus made up of two coil arrays which are electromagnetically coupled, one coil array being held within a drawing surface and the other coil being encased within a drawing stylus. If the drawing surface contains two such sets of rectangular coils, with the long axes of one set being perpendicular to the long axes of the other, then the apparatus can be used to generate the (x,y) coordinates of the stylus nib when it is close to the drawing surface.

A specially constructed coil array, housed within the stylus, may be used with such a sensing apparatus to provide data describing the rotation of the stylus and its degree of tilt from the perpendicular along the x-y axes.

An energised horizontal coil is positioned such that its axis lies parallel to those of an array of coils connected in series and alternately wound in opposite directions. A voltage will be induced in the latter coils whereby the phase and amplitude of the combined signal from those coils reflect whether the influencing magnetic field is over a clockwise- or anticlockwise-wound receiving coil. This arrangement is shown in FIG. 1 of the attached representations.

With the transmitting coil positioned at "A" in FIG. 1, the induced e.m.f of the combined signal will be phasecoherent with that of the transmitting coil. If the same transmitting coil is positioned over coil "B" the resulting e.m.f inverts the phase.

This method of position sensing requires additional information in order to reflect the position of the transmitting coil either side of any single coil in the receiving set. i.e. position "X" in FIG. 1 would cause the same resultant e.m.f as position "Y".

This ambiguity can be avoided by adding a second set of coils, identical to the first and interleaving them between the first set. See FIG. 2 of the attached representations.

It can be demonstrated that the resultant e.m.f generated for coil set in FIG. 1 is very closely proportional to:

$$SIN(wt)SIN(2\pi d/P) \tag{1}$$

then for the displaced coils we will have the same result except "d" will be displaced by P/4. The equation for e.m.f (2) generated will then be approximtely:

$$SIN(wt)SIN(2\pi(d+P/4)/P) = SIN(2\pi d/P + \pi/2).$$

Using identity $$COS(A) = SIN(A + \pi/2)$$

so $$e.m.f(2) = SIN(wt)COS(2\pi d/P) \tag{2}$$

Since the signal driving the transmit coil can be of a known phase then the resultant outputs from both sets of receiving coils can be regarded as being proportional to "d" only.

Thus there exists a pair of signals which represent the SIN and COS of the displacement of the source coil across pitch "P" of the receive coils. It is therefore possible to resolve "d" from these signals after they have been suitably demodulated, although demodulation is not strictly necessary.

The elongated nature of the sense coils allows the apparatus to operate as a practical digitising tablet and stylus by detection of field changes primarily across their short axes.

An apparatus of this nature is discussed in GB-A-1536123.

The drawback of this type of construction is that it is capable of generating only positional co-ordinate information and an indication of the degree of tilt of the stylus from the vertical. It is not possible to obtain information regarding the rotational position of the stylus.

SUMMARY OF THE INVENTION

The present invention aims to overcome this and allow rotational sensing to be incorporated into the transducer.

According to the present invention, it is now proposed that a second source coil is now placed across the first such that they lie at right angles to each other. A separate drive current is supplied to the new coil which is in phase quadrature with the first drive current. Placing the coils at right angles to each other avoids any mutual induction between them. The second coil is now in the correct orientation to cause an e.m.f to be induced in the receiving set; however the phase of this signal will be displaced by 90 degrees reflecting that of its drive current. The generation magnetic field is detected by a planer detector of the type already known.

This system has the advantage that it will unambiguiusly reflect the position of the transmitter over 360 degrees of rotation. Processing means, possible a computer can be supplied to generate the required data from the output e.m.fs.

The apparatus could also be built with windings arranged as described above, but an e.m.f. is instead induced in the coils by an externally generated magnetic field generated by energising the coils in the digitising tablet.

In a preferred arrangement, a further winding is provided arranged with its axis parallel to the free axis. The output of this coil may be used to generate linear positional data.

In one arrangement of the apparatus each winding is formed from a single, continuous coil. This has the advantage that, if the coils are wound through each other, the theoretically optimal arrangement of the coils can be achieved.

Alternatively, each winding is formed from a plurality of separate, but electrically connected coils. This has the advantage that a near optimal arrangement of the coils can be achieved without the difficulty of winding two coils together.

In a common arrangement, the windings are housed in a hand-held device, often in the form of a drawing stylus.

A preferred arrangement of this allows the position of the points of intersection of the axes of coil windings and the long axis of the carrier to be adjustable. This allows errors caused by the tilting of the carrier to the vertical to be minimised.

The processing means may include a demodulator and integrater to process the output to provide a D.C. component which is available for conversion to computer data. Further differentiating means may be included to generate values for the angular velocity and acceleration from the output signal.

BRIEF DESCRIPTION OF THE DRAWINGS

An embodiment of the invention will now be described with reference to the following figures:

FIG. 5 shows the effect of rotating the transmitting coil;

FIG. 6 shows the trajectory through which the transmitting coil can pass without causing a phase change;

FIG. 7 shows the arrangement of two perpendicular coil windings; and

FIG. 8 shows a practical arrangement of the transmitting and receiving coils.

DETAILED DESCRIPTION

The embodiment described is a configuration of coils built into a stylus and a method of signal processing which is used with a known digitising tablet technology in such a way that the complete digitiser generates data on the position and motion of the stylus with respect to:

(a) The absolute (x,y) co-ordinates of the stylus nib on drawing surface containing the receiving coil array;

(b) The absolute axial rotation of the stylus.

(c) The tilt of the stylus from the line perpendicular to the plane of the receiving coil array.

Figure 3:
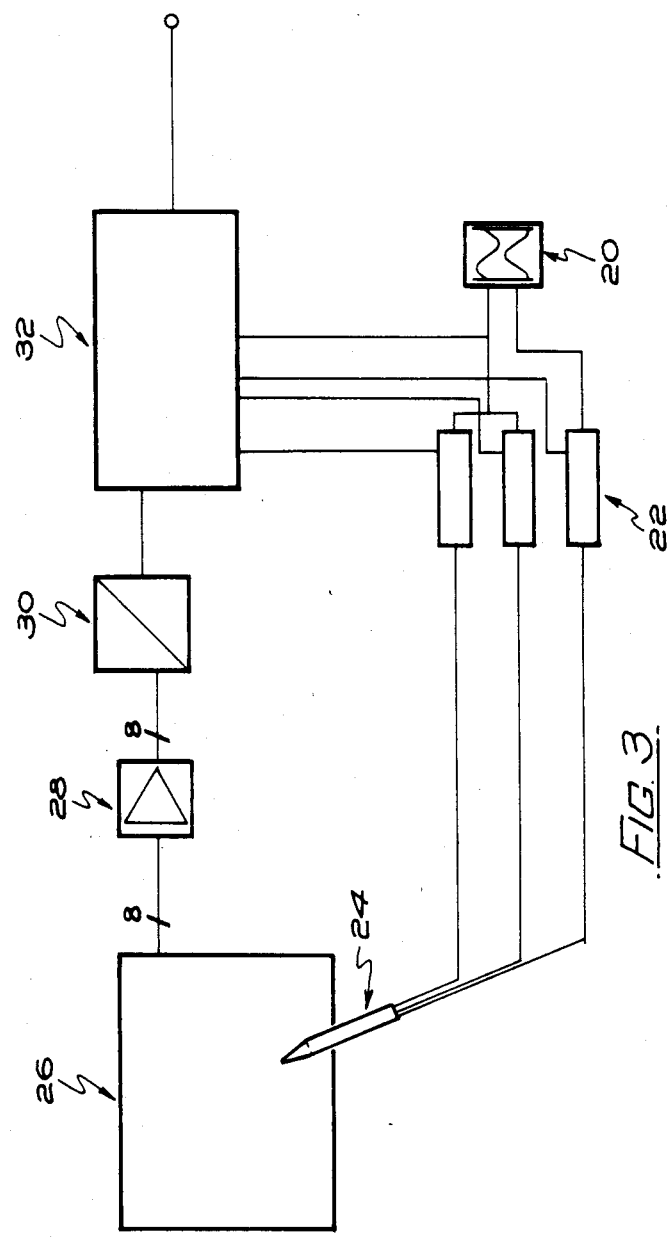
FIG. 3 shows a schematic diagram of a possible arrangement of the energising and processing means.

In FIG. 3 a signal generator 20 produces two A.C. waveforems in quadrature. These are fed, via electronic switches 22 to stylus 24. The coils in stylus 24 generate a magnetic field which induces emfs in the coils 12 in tablet 26. These emfs are fed to amplifier 28 and hence to analogue-to-digital cconverter 30. The digital signal is then processed by digital signal processor 32 which produces the required output signal. The digital signal processor also receives a phase reference signal from signal generator 20 and can control the electronic switches.

Figure 4:
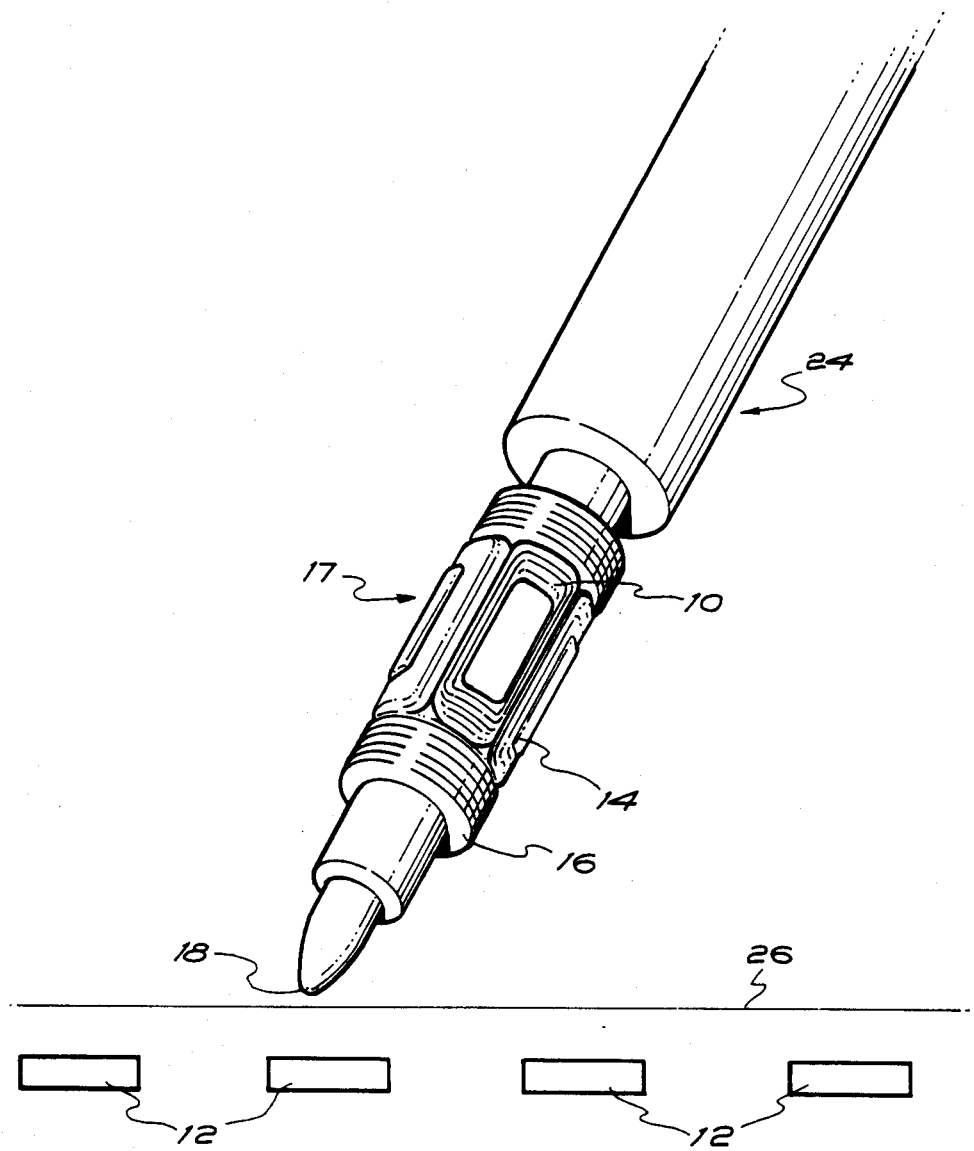
FIG. 4 shows how the coils may be arranged in a digitiser stylus.

The stylus 24 contains an array 17 of coil units 10, 14, 16 in a specific configuration such that sequentially activating each coil unit with an alternating current will induce e.m.f. in the receiving coils. The preferred arrangement of the coils is shown in FIG. 8 to be discussed later. FIG. 4 shows how this array may be incorporated into the digitising stylus 24. Here, the rotational data transmitting windings 10, 14 and the positional data transmitting winding 16 are mounted on the stylus body. It can be seen that this arrangement of windings corresponds closely to that shown in FIG. 8.

Figure 1:
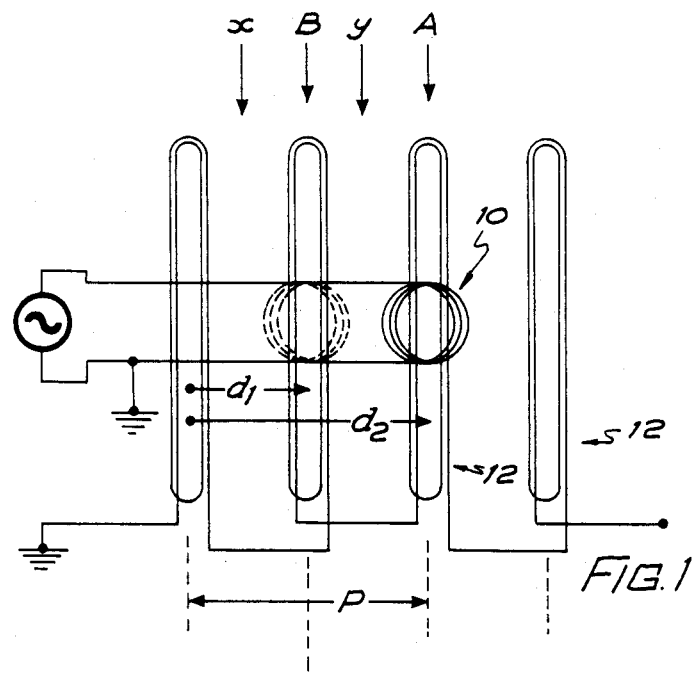
FIG. 1 shows the known digitiser arrangement with a normal receiving coil array and has already been discussed.
Figure 2:
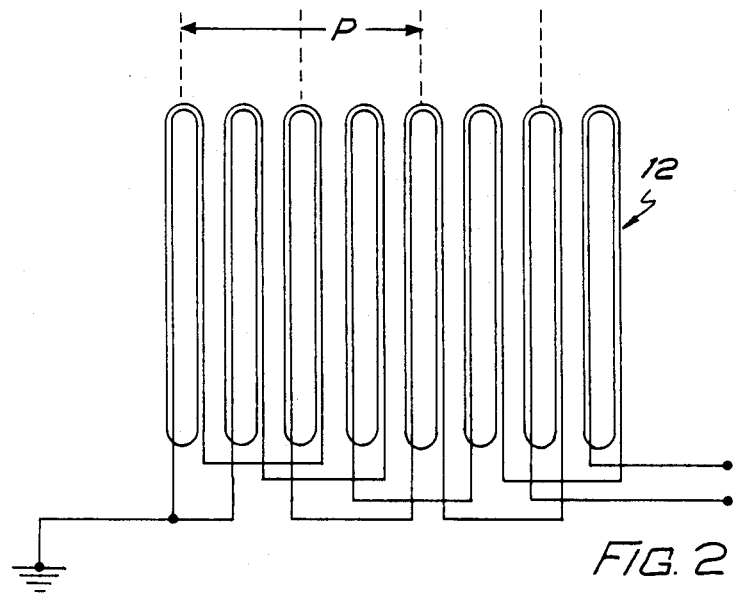
FIG. 2 shows the interleaved type of receiving coil array and has already been discussed.

The received signals from the tablet coils 12 contain phase and amplitude information, and are used to supply a computer with raw data from which measures of stylus position, rotation and tilt can be extracted. The embodiment will now be described showing how a complex configuration of transmitting coils can be constructed so as to permit the detection of its own rotation using existing digitizer technology. The technique as described in FIG. 1 shows how a source coil 10, shown vertically oriented, will induce e.m.f in a receiving set of coils 12.

If the same transmitting coil is rotated about its diametrical axis such that its major axis lies on the plane perpendicular to that of the tablet coils 12 then the apparent effect on the received pair of signals is a phase change of 90 degrees; equivalent to a positional difference of the source coil 10 of P/4. This is shown FIG. 3.

As this horizontally oriented coil 10 is traversed across the receiving coils 12 an e.m.f will be generated in the receiving set similar to the vertical coil offset by P/4.

As the source coil 10 moves along the trajectory "t" in FIG. 6 no change in the phase of the received signal will occur. The stylus 24 is shaped so that the source coil 10 follows this curve as the stylus is tilted. Therefore it is possible to achieve consistent readings irrespective of the tilt of the stylus 24. Furthermore the distance between the stylus tip 18 and the centre of the coil array 17 is set to P/2. This ensures that the greatest possible change in signal is obtained from a given stylus movement.

As this horizontal coil 10 is rotated about a vertical axis from orientation "U" to "V" on the same plane then the flux path from each end of the construction will cross the long axis of the receiving coils 12 in equal strengths but opposite polarity. No net e.m.f. will now be induced into the receiving coils 12.

Referring to FIG. 7 a second source coil 14 is now placed across the first 10 such that they lie at right angles to each other. A separate drive current is supplied to the new coil 14 which is in phase quadrature with the first drive current. Placing the coils 10, 14 at right angles to each other avoids any mutual induction between them.

The second coil 14 is now in the correct orientation to cause e.m.f to be induced in the receiving set; however the phase of this signal will be displaced by 90 degrees reflecting that of its drive current.

As the complete transmitter coil assembly 17 is rotated back to its original horizontal position the phase of the received e.m.f will follow this rotation. This system will unambiguously reflect the rotation of the transmitter assembly over 360 degrees rotation.

A practical transmitting coil assembly 17 is therefore a vertical coil 16 to generate absolute position over the digitiser 26 surface and a pair of horizontal coils 10, 14 formed at right angles to each other which will develop a received signal, whereby the phase, relative to that of the vertical 16 coil, will be a measure of rotation of the assembly.

Coils can not be readily wound such that they pass through each other, so the effect of three solid coils is approximated with the arrangement in FIG. 8.

Each of the transmitting coils 10, 14, 16 is driven in sequence, with an alternating current; each activated coil causing a characteristic e.m.f to be induced in the tablet coils 12. This induced e.m.f is received by the processing means whereby it is demodulated to obtain the position and rotation of the stylus 24. The amplitude information received can be used as proximity data, indicating the distance between the stylus 24 and the tablet, within certain limits. The positional and rotational data may then be differentiated by the processing means, in order to obtain values for positional and angular velocity and acceleration is three dimentions.

What is claimed is:

1. A position sensing apparatus comprising:
    a free axis;
    a transmitting part, said transmitting part having a first winding and a second winding, each of said first and second windings being for generating a magnetic field, said first and second winding each having an axis with said axes of said first and second windings being mutually perpendicular to said free axis;
    a receiving part, said receiving part having a plurality of elongate windings for generating e.m.f.s. when subject to the magnetic fields generated by said first and second windings, and to generate an output corresponding to said e.m.f.s.;
    means for providing two AC waveforms in quadrature, said two AC waveforms being respectively applied to said first and second windings for causing said first and second windings to generate said magnetic field; and means for analysing said output of said receiving means so as to provide rotational information relating to said free axis, said apparatus further comprising a further coil winding arranged with its axis parallel to the free axis, thereby to generate linear positional data of said free axis.

2. A position sensing apparatus according to claim 1 wherein at least one of the windings is a single continuous coil.

3. A position sensing apparatus according to claim 1 wherein at least one of the windings is a plurality of separate axially aligned electrically connected coils.

4. A position sensing apparatus according to claim 1, further comprising:
    a hand held device defining said free axis, said first and second windings being fixed to said hand held device; and
    a surface adjacent said receiving part, said hand held device having a contact part for contacting said surface.

5. A position sensing apparatus according to claim 4 wherein said hand held device is elongate with a longitudinal axis corresponding to said free axis, and the position of intersection of said longitudinal axis device and said axes of said first and second windings is adjustable in relation to the rest of the hand held device to control the resolved rotational error when the longitudinal axis is displaced from being perpendicular to said surface.

6. A position sensing apparatus according to claim 1 wherein said analysing means is arranged to demodulate and integrate said output of the receiving part, the resultant D.C. component being available for conversion to computer data.

7. A position sensing apparatus according to claim 1 wherein said analysing means is arranged to differentiate the output of said receving part thereby to derive an angular velocity or angular acceleration of the windings.

8. A position sensing apparatus comprising:
    a free axis;
    a transmitting part having a plurality of elongate windings for generating a magnetic field;
    a receiving part having a first winding and a second winding, each of said first and second windings being for generating e.m.f.s. when subject to said magnetic field and for generating outputs corresponding to said magnetic fields, said first and second windings each having an axis with said axes of said first and second windings being mutually perpendicular to said free axis;
    means for applying two AC waveforms in quadrature to said elongate windings of said transmitting part for causing said elongate windings to generate said magnetic fields; and
    means for analysing said outputs of said receiving part so as to provide rotational information relating to said free axis;
    said apparatus further comprising a further coil winding arranged with its axis parallel to the free axis, thereby to generate linear positional data of said free axis.

9. A position sensing apparatus according to claim 8 further comprising;
    a hand held device defining said free axis, said first and second windings being fixed to said hand held device; and
    a surface adjacent said receiving part, said hand held device having a contact part for contacting said surface.

10. A position sensing apparatus according to claim 9 wherein said hand held device is elongate with a longitudinal axis corresponding to said free axis, and the position of intersection of said longitudinal axis device and said axes of said first and second windings is adjustable in relation to the rest of the hand held device to control the resolved rotational error when the longitudinal axis is displaced from being perpendicular to said surface.

* * * * *